United States Patent [19]

Dezelan

[11] 4,189,920
[45] Feb. 26, 1980

[54] LOAD SIGNAL CONTROL OF HYDRAULIC MOTOR DISPLACEMENT

[75] Inventor: Joseph E. Dezelan, Western Springs, Ill.

[73] Assignee: Caterpillar Tractor Co., Peoria, Ill.

[21] Appl. No.: 35,120

[22] Filed: Feb. 8, 1979

[51] Int. Cl.$^2$ ............................................. F15B 11/16
[52] U.S. Cl. ...................................... 60/420; 60/445; 60/484
[58] Field of Search ................ 60/420, 426, 484, 445, 60/451

[56] References Cited

U.S. PATENT DOCUMENTS

| | | | |
|---|---|---|---|
| 2,941,365 | 6/1960 | Carlson et al. | 60/451 X |
| 3,984,978 | 10/1976 | Alderson | 60/445 X |
| 4,124,333 | 11/1978 | Liesener | 60/445 X |

*Primary Examiner*—Edgar W. Geoghegan
*Attorney, Agent, or Firm*—Wegner, Stellman, McCord, Wiles & Wood

[57] ABSTRACT

A vehicle drive and work performing system including a rotary output, variable displacement, hydraulic drive motor (22) adapted to drive a vehicle, at least one hydraulic implement motor (14,16 and 18) adapted to power a work performing implement, a hydraulic pump (10) providing hydraulic fluid under pressure to the motors, a flow control valve (12) for controlling the fluid flow from the pump to at least the drive motor, and a pressure control valve (30) for controlling the displacement of the drive motor to achieve a desired fluid pressure level at the drive motor, and including the improvement wherein a load sensor (60,62) is connected to the implement motor for providing a signal representing the load thereon and a piston (54) is responsive to the signal for causing the pressure control valve to change the displacement of the drive motor to thereby change the fluid pressure level thereat to a value different from the desired fluid pressure level.

7 Claims, 1 Drawing Figure

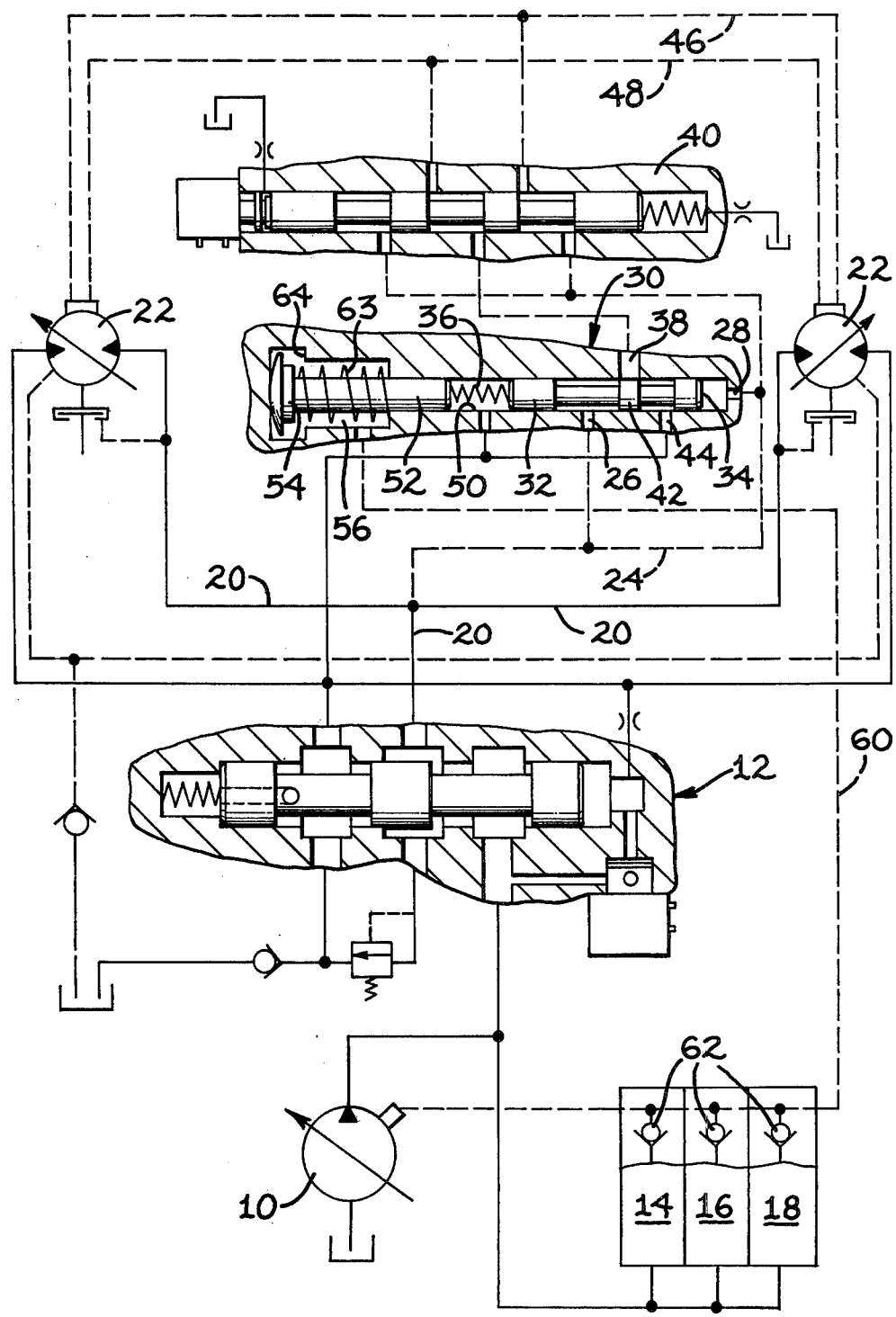

LOAD SIGNAL CONTROL OF HYDRAULIC MOTOR DISPLACEMENT

DESCRIPTION

1. Technical Field

This invention relates to hydraulic systems wherein a plurality of hydraulic motors, including one of the variable displacement type, are provided with hydraulic fluid under pressure from a common pump. More specifically, it relates to control of the displacement of the variable displacement motor in response to loading imposed upon other motors in the system.

2. Background Art

Prior art of possible relevance includes U.S. Pat. No. 3,984,978 issued Oct. 12, 1976 to Alderson.

Many hydraulic systems in use today utilize a plurality of hydraulic motors for performing different tasks, at least one of which is a variable displacement motor. Typically, a common pump supplies fluid under pressure to all of the motors.

A typical example of such a system is that disclosed in the above identified Alderson patent wherein a rotary output, variable displacement hydraulic motor is used to drive one of the front wheels of a motor grader as an auxiliary source of motive power. The pump used to supply the variable displacement motor of Alderson is also employed to provide fluid under pressure to other implements normally associated with a motor grader as, for example, the swing circle, mold board, etc.

In such an environment, the variable displacement motor is operated by and large continually (or at least when auxiliary front wheel drive power is required) while the other motors for the various implements are operated only intermittently as, for example, when it is desired to change the angle of the mold board relative to the motor grader frame or when it is desired to raise or lower the mold board with respect to the vehicle frame.

As a consequence, economical engineering practices require that the pump capacity be about equal to or only slightly greater than the demand capacity of the motors that are operated on a continuous basis. To provide a higher pump capacity would require a larger pump and thus more expense. This additional expense is undesirable since the increased capacity is excess capacity whenever the intermittently operated hydraulic motors are not being utilized.

For a considerable majority of the time of operation of such a system, this arrangement works well. However, there are occasions when difficulties arise. A typical case occurs when the variable displacement motor is operating at maximum demand capacity thereby utilizing substantially all of the output of the pump and the need arises to utilize, simultaneously, one of the implements and its associated hydraulic motor. Because pump capacity is already being met, or at least very nearly so, there will be insufficient hydraulic fluid under the requisite pressure required to operate the hydraulic motor for the implement. Consequently, the implement cannot be utilized simultaneously with the variable displacement motor in such a situation.

To alleviate this problem, the prior art has resorted to the use of flow interruption devices to the variable displacement motor which halts or severely restricts the flow of fluid thereto to cause a build-up of system pressure and provide the requisite quantity of hydraulic fluid to the implement motor. This, of course, means that the function associated with the variable displacement motor cannot be performed simultaneously with the function associated with the hydraulic motor for the implement.

DISCLOSURE OF THE INVENTION

In one aspect of the present invention there is provided a work performing system including a rotary output, variable displacement hydraulic motor and at least one additional hydraulic motor. A hydraulic pump is included for providing hydraulic fluid under pressure to the motors and a flow control valve is utilized for controlling fluid flow from the pump to at least the variable displacement motor. A pressure control valve is utilized for controlling the displacement of the variable displacement motor to achieve a desired fluid pressure level at the drive motor. The invention contemplates the improvement including load sensing means connected to the additional motor for providing a signal representing the load thereon and means responsive to the signal for causing the pressure control valve to change the displacement of the drive motor to thereby change the fluid pressure level thereat to a value different from the desired fluid pressure level.

As a consequence, demand for hydraulic fluid by the variable displacement motor is altered to provide fluid for the additional motor without halting the operation of the function performed by the variable displacement motor and enabling the function associated with the additional motor to be performed.

BRIEF DESCRIPTION OF THE DRAWING

The FIGURE is a schematic of one embodiment of a hydraulic system made according to the invention.

BEST MODE FOR CARRYING OUT THE INVENTION

An exemplary embodiment of the invention is illustrated in the FIGURE and will be described hereinafter as being utilized in the environment of a motor grader. However, those skilled in the art will readily appreciate that the same may be used with efficacy in other environments wherever it is desired to closely match the capacity of a hydraulic pump with the demand capacity of one or more variable displacement motors which are used with greater frequency than other system associated motors.

The system includes a pressure compensated hydraulic pump 10 for providing hydraulic fluid under pressure to a flow control valve, generally designated 12 and to a plurality of hydraulic implement circuits each including a hydraulic motor. Three such circuits are shown schematically and designated 14, 16 and 18.

The flow control valve 12, for purposes of the present invention, may be regarded as conventional and when opened as shown, conveys fluid from the pump 10 to a line 20 connected to each of two variable displacement, rotary output, hydraulic motors 22. In the usual case, in a motor grader environment, one of the motors 22 would drive the left front wheel while the other would drive the right front wheel. The implement circuits 14, 16 and 18 and their associated hydraulic motors would be utilized in, for example, the swing circle for the mold board, the circuit for elevating or lowering the mold board, etc.

A pilot line 24 is connected to the high pressure line 20 to direct hydraulic fluid under pressure to ports 26 and 28 of a pressure control valve 30. The pressure control valve 30 includes a spool 32 having a pressure responsive surface 34 on one end thereof and in fluid communication with the port 28. A compression spring 36 abuts the opposite end of the spool 32 to urge, in bucking relation to the pressure responsive surface 34, the spool 32 to the right as viewed in the FIGURE.

The pressure control valve 30 further includes a port 38 which is connected to a conventional direction control valve 40 which may be utilized to control the direction of rotation of the output shafts of the motors 22 in the usual fashion.

The spool 32 includes a land 42 for controlling fluid communication through the pressure control valve 30, that is, allowing fluid communication between the port 38 and the port 26, or between the port 38 and a port 44 connected to the hydraulic reservoir for the system.

The pilot line 24 also extends to the direction control valve 40 in the manner shown and the latter is in fluid communication with two lines 46 and 48, each extending to the swashplate control of each of the motors 22.

The swashplate controls for the motors 22 are conventional and form no part of the present invention. Similarly, the operation of the direction control valve 40 is conventional. For the purposes of the present invention, it is sufficient to appreciate that for the direction of rotation the output shafts of the motors 22 would assume for the illustrated position of the direction control valve 40, the higher the pressure in the line 46 relative to the line 48, the greater the displacement of the motors 22. As the relative difference in pressure is decreased, the swashplates of the motors 22 will respond to progressively minimize displacement and when the pressures are the same the swashplates will assume a neutral condition. Finally, it will be appreciated that for a given rotational output speed of the motors 22, as displacement increases, the flow of hydraulic fluid per unit of time also increases and this of course tends to decrease the system pressure once the maximum output flow of the pump has been reached.

To the extent thus far described, the pressure control valve 30 operates to alter the displacement of the motors 22 to maintain a minimum desired pressure level thereat. Under steady state conditions, the land 42 on the spool 32 will generally be in the position illustrated in the drawing, modulating fluid flow between the port 38 and the ports 26 and 44. When system pressure begins to decrease, the total force applied to the pressure responsive surface 34 will decrease so that the spring 36 will tend to shift the spool 32 to the right as viewed in the drawing. As a consequence, pressure fluid from the line 24 will be directed via the port 26 to the port 38 and through the direction control valve 40 to increase the pressure in the line 48 relative to the pressure in the line 46 and thereby destroke the motors 22, that is, reduce their displacement, thereby increasing system pressure until a steady state condition is again achieved. The minimum desired pressure level representative of steady state operation is determined by the spring constant of the biasing spring 36 and the distance the land 42 must travel from its rightmost position to that illustrated in the drawing. In a typical motor grader application, this pressure level might be, say, 1800 psi.

As generally alluded to previously, on occasion, the hydraulic motor associated with one of the implement circuits 14, 16 or 18, may require fluid delivery at a higher pressure to perform its function. Thus, the invention contemplates the provision of means for sensing when such is necessary and for increasing the system pressure level above the normal 1800 psi according to the foregoing example. To this end, a bore 50 of the pressure control valve 30 receiving the spool 32 also receives the reduced end 52 of a piston 54. The head end of the piston 54 is enlarged and is received in a chamber 56 coaxial with the bore 50. Both sides of the head end of the piston 54 are subjected to the pressure of any hydraulic fluid within the chamber 56 but by reason of the fact that the reduced end 52 extends out of the chamber 56, a differential pressure area is created with that on the left side of the head of the piston 54 being larger than that on the right as viewed in the drawings. Consequently, the application of fluid under pressure to the interior of the chamber 56 will impart a shifting force to the piston 54 tending to move the same to the right within the bore 50.

The reduced end 52 of the piston 54 bears against the end of the spring 36 opposite from the spool 32 and such rightward movement will, of course, tend to compress the spring 36 further and thereby increase the pressure value required to be applied against the pressure responsive surface 34 of the spool 32 necessary to shift the same to the left such that the land 42 can move to the position illustrated in the drawings at which steady state conditions exist. As a result, some higher pressure must be present at the port 28 to shift the spool 32 to the illustrated position when the piston 54 has moved some distance to the right than when the piston 54 is in the position illustrated. This, in turn means that existing system pressure, at any level will be applied to the line 48 via the ports 26 and 38 of the pressure control valve 30 and the direction control valve 40 until system pressure increases above the normal 1800 psi to that which is required to shift the spool 32 to the position illustrated. And this in turn narrows the pressure differential between the lines 46 and 48 thereby causing the motors 22 to destroke, i.e., move towards minimum displacement which, of course, has the effect of increasing system pressure to the point necessary to achieve steady state conditions.

Application of fluid under pressure to the interior of the chamber 56 is provided via a load signal line 60 connected via check valves 62 into the implement circuits 14, 16 and 18. The load signal of each of the circuits 14, 16 and 18 is taken from the high pressure side thereof and applied to the line 60 assuming that the pressure already existing in the line 60 is not greater than that in the corresponding circuits. If the latter is the case, the corresponding check valve 62 will not open. Thus, the check valves serve to isolate the circuits 14, 16 and 18 from each other while allowing the highest pressure load signal in any to be directed to the chamber 56.

As thus far described, even a small load signal, as for example, 100 psi, on the line 60 would cause a comensurate increase in the overall system pressure. The precise increase would, of course, be dependent upon the ratio of the areas on opposite sides of the head of the piston 54.

However, it is seldom necessary that for such a low load signal in the implement circuits that the overall system pressure be increased. Thus, a level setting spring 63 is disposed within the chamber 56 to bias the piston 54 to the left as viewed in the drawing. The spring constant of the spring 63 is chosen to set the level of the load signal 60 at which the piston 54 will begin to move to the right. In a typical motor grader environment, the spring 63 might be chosen so that the load signal on the line 60 must reach at least 1600 psi before the piston 54 begins to move to the right.

Industrial Applicability

The pump 10 is, as alluded previously, sized to have a capacity approximately equal to or just slightly greater than the maximum demand capacity of the hydraulic motors 22 in the aggregate. Assuming the system is operating with only the motors 22 being provided with hydraulic fluid under pressure, and then at a rate far less than their demand capacity, and one or more of the circuits 14, 16 and 18 is energized to apply hydraulic fluid under pressure to the hydraulic motor associated therewith, because the pump 10 has for the particular operational sequence of concern excess capacity, it can provide sufficient flow at the normal system pressure, for example 3500 psi, to the energized circuit 14, 16 and/or 18. Because the pump 10 has sufficient capacity for all operated components, pressure in the system will not drop. If 1800 psi is sufficient to operate the appropriate implement circuit, it will be operated with an appropriate load signal of, say, 1600 psi or less being applied via the line 60 to the piston 54. Essentially no change will occur.

In the situation where the motors 22 are demanding substantially all of the capacity of the pump 10, the emergization of one of the implement circuits 14, 16 or 18 will create a demand for hydraulic fluid in excess of pump capacity which will cause system pressure to drop. This in turn will reduce the total force applied against the pressure responsive surface 34 of the spool 32 causing the spool 32 to shift to the right and ultimately increase the pressure in the line 48 relative to the line 46 thereby cutting back the displacement of the motors 22. Of course, for a given speed, the reduction in displacement of the motors 22 reduces their quantity demand for hydraulic fluid with the consequence that motors 22 no longer demand the full capacity of the pump 10 thereby providing excess capacity in the pump 10 over the demands of the motors 22 sufficient to drive the implement circuits. And, should the pressure be insufficient, it will be increased in the manner mentioned previously.

However, if the hydraulic motor associated with the energized circuit 14, 16 or 18 requires more pressure, a load signal somewhere in excess of 1600 psi (and not more than existing system pressure) will be applied to the piston 54 causing the same to move to the right increasing the compression on the spring 36 and shifting the spool 32 to the right. As a consequence, via the path mentioned previously, pressure will increase in the line 48 relative to the line 46 causing the swashplates of the motors 22 to move towards a minimum displacement position. This, in turn, will tend to cause system pressure to increase. With this increase, the pressure of the load signal on the line 60 will also increase and system pressure will as a result continue to increase. At some point in time, there will be sufficient pressure to cause the hydraulic motor associated with the energised implement circuit 14,16 or 18 to perform its desired function at which time the load signal on the line 60 will attain a substantially constant value and no further increase in system pressure will occur. Alternately, if system pressure increases to an undesirably high value, the indicated pressure relief valve may relieve it. Preferrably, however, before such occurs, the enlarged head of the piston 54 will abut the stepped edge 64 of the chamber 56 to halt rightward movement of the piston 56 thereby halting the increase in system pressure.

In any event, system pressure is automatically increased to the extent necessary to operate the desired implement circuit or circuits without halting operation of the motors 22 by merely destroking them, that is, cutting back on their displacement.

Thus, the hydraulic system of the invention allows close matching of capacities of pumps and the motors utilized therein to provide for economical construction and yet eliminates undesirable interruption of the supply of fluid to the motors 22 as in the prior art systems.

I claim:

1. In a vehicle drive and work performing system including a rotary output variable displacement hydraulic drive motor (22) adapted to drive a vehicle, at least one hydraulic implement motor (14, 16, 18) adapted to power a work performing implement, a hydraulic pump (10) for providing hydraulic fluid under pressure to said motors, a flow control valve (12) for controlling fluid flow from the pump to at least the drive motor, and a pressure control valve (30) for controlling the displacement of the drive motor to achieve a desired fluid pressure level at the drive motor, the improvement comprising load sensing means (60,62) connected to said implement motor for providing a signal representing the load thereon, and means (54) responsive to said signal for causing the pressure control valve to change the displacement of said drive motor to thereby change the fluid pressure level thereat to a value different from said desired fluid pressure level.

2. The vehicle drive and work performing system of claim 1 wherein said pressure control valve is responsive to said causing means to reduce the displacement of said drive motor to increase the fluid pressure level above said desired fluid pressure level to insure that fluid under adequate pressure is available in the system to operate said implement motor at the sensed load thereon.

3. The vehicle drive and work performing system of claim 2 wherein said pressure control valve includes a spool (32) having a biasing spring (36) and a pressure responsive surface (34) in bucking relation thereto and in fluid communication with said pump, and wherein said causing means include means (52,54) for applying an additional force to said spool in concert with said spring.

4. The vehicle drive and work performing system of claim 3 wherein said additional force applying means comprises a piston (52,54) and said signalling means providing said signal as hydraulic fluid under pressure to said piston.

5. The vehicle drive and work performing system of claim 4 wherein said biasing spring is a compression spring and said piston is operative to compress said spring.

6. The vehicle drive and work performing system of claim 5 further including an additional biasing spring (62) urging said piston away from said compression spring, the bias of said additional spring serving to set a pressure level whereat said causing means becomes effective.

7. In a hydraulic work performing system including a rotary output variable displacement hydraulic motor (22), at least one additional hydraulic motor (14, 16, 18), a hydraulic pump (10) for providing hydraulic fluid under pressure to said motors, a flow control valve (12) for controlling fluid flow from the pump to at least the variable displacement motor, and a pressure control valve (30) for controlling the displacement of the variable displacement motor to achieve a desired fluid pressure level at the drive motor, the improvement comprising load sensing means (60,62) connected to said additional motor for providing a signal representing the load thereon, and means (52,54) responsive to said signal for causing the pressure control valve to decrease the displacement of said variable displacement motor to thereby increase the fluid pressure level thereat to a value different from said desired fluid pressure level.

* * * * *